United States Patent [19]

Klett et al.

[11] Patent Number: 4,784,918

[45] Date of Patent: Nov. 15, 1988

[54] COMPOSITIONS AND COATINGS OF PHOSPHORUS-CONTAINING FILM FORMERS WITH ORGANO SILANE AND COATED SUBSTRATES

[75] Inventors: Michael W. Klett; Balbhadra Das, both of Allison Park, Pa.

[73] Assignee: PPG Industries, Inc., Pittsburgh, Pa.

[21] Appl. No.: 31,630

[22] Filed: Mar. 30, 1987

[51] Int. Cl.$^4$ .......................... B32B 9/04; C09D 5/16; C08F 283/00; C08G 79/02

[52] U.S. Cl. ........................ 428/447; 106/18.14; 106/18.18; 252/607; 252/608; 427/387; 427/389.7; 427/389.8; 427/393.3; 428/365; 428/379; 428/383; 428/413; 428/423.1; 428/429; 428/454; 525/474; 525/538; 528/398; 528/399

[58] Field of Search .................. 427/393.3; 106/18.14, 106/18.18; 252/608, 607; 528/398, 399; 525/474, 538; 427/393, 387; 428/447

[56] References Cited

U.S. PATENT DOCUMENTS

| | | | |
|---|---|---|---|
| 2,772,188 | 11/1956 | Reeves et al. | 117/136 |
| 2,809,941 | 10/1957 | Reeves et al. | 260/2 |
| 2,812,311 | 11/1957 | Reeves et al. | 260/2 |
| 2,983,623 | 5/1961 | Coates | 117/62 |
| 3,122,581 | 2/1964 | Pike | 260/148.8 |
| 3,546,179 | 12/1970 | Koller | 260/75 |
| 3,669,725 | 6/1972 | Nachbur et al. | 117/136 |
| 3,765,837 | 10/1973 | Aycock et al. | 8/115.7 |
| 3,869,340 | 3/1975 | Kotzsch et al. | 161/182 |
| 3,874,911 | 4/1975 | Nachbur et al. | 117/136 |
| 3,878,245 | 4/1975 | Nachbur et al. | 260/553 R |
| 3,883,462 | 5/1975 | Pearson | 260/29.4 R |
| 3,931,310 | 1/1976 | Nachbur et al. | 260/551 P |
| 3,932,502 | 1/1976 | Nachbur et al. | 260/553 B |
| 3,956,243 | 5/1976 | Loss et al. | 260/67.6 R |
| 3,961,110 | 6/1976 | Daigle et al. | 427/390 |
| 3,983,269 | 9/1976 | Pearson | 427/370 |
| 3,984,367 | 6/1976 | Pearson | 260/29.4 R |
| 4,066,391 | 1/1978 | Weyker et al. | 8/116 |
| 4,119,598 | 10/1978 | Pearson | 260/29.4 R |
| 4,146,585 | 3/1979 | Ward et al. | 260/827 |
| 4,166,897 | 9/1979 | Umetani et al. | 528/398 |
| 4,215,172 | 7/1980 | Pearson | 428/264 |
| 4,265,945 | 5/1981 | Frank | 427/393.3 |
| 4,277,538 | 7/1981 | Beckmann et al. | 428/429 |
| 4,292,036 | 9/1981 | Walsh et al. | 252/608 X |
| 4,370,422 | 1/1983 | Pearson | 524/598 |
| 4,401,698 | 8/1983 | Tripp | 427/387 |
| 4,419,401 | 12/1983 | Pearson | 428/262 |
| 4,427,745 | 1/1984 | Pearson | 428/524 |
| 4,468,495 | 8/1984 | Pearson | 525/158 |
| 4,532,176 | 7/1985 | Briggs et al. | 428/288 |
| 4,585,703 | 4/1986 | Taguchi et al. | 428/446 |

FOREIGN PATENT DOCUMENTS 418458 3/1974 U.S.S.R. .
1179242 1/1970 United Kingdom .

OTHER PUBLICATIONS

Abstract of article "[.beta.-Dialkoxyphosphinyl)ethyl]-triethoxysilane from *German* Offen. De 2219983, Nov. 8, 1973.

Abstract of article "IR Spectra and Dipole Moments of Some Silyl Derivatives of Diethylphosphonates", *Journal Zh. Obshch.* Khim, 48(10), 2380-1.

"Silicon Compounds Register And Review" Petrarch Systems, Inc., p. 118.

Abstract of article "The Nature of Surface States on Chemically Modified Titanium Dioxide Electrodes", Journal of Electrochemical Society 127(7), 1518-25, Micha Tomkiewicz.

Abstract of article "Reaction of 1-vinylsilatranes With Organophosphorus Compounds Containing a Phosphorus-Hydrogen Bond", Journal Zh. Obshch. Khim., 49(7), 1525-8 (M. G. Voronkov et al.).

*Primary Examiner*—Thurman K. Page
*Attorney, Agent, or Firm*—Kenneth J. Stachel

[57] ABSTRACT

Improved flame retardant coatings are produced from curable chemical mixtures having at least one phosphorus-containing film former which has hydroxyl and/or methylol functionalities, and at least one nucleophilic organo silane. The silane is capable of undergoing nucleophilic reaction with hydroxyl radical displacement and/or capable of Michael's addition type of reaction via a nucleophilic phosphine compound. Additionally, the curable chemical mixture can involve an interaction polymeric product of the phosphorus-containing film former and nucleophilic organo silane. Also solvents such as water, curing agents, fillers and/or extenders may be present in the mixture.

24 Claims, No Drawings

COMPOSITIONS AND COATINGS OF PHOSPHORUS-CONTAINING FILM FORMERS WITH ORGANO SILANE AND COATED SUBSTRATES

The present invention is directed to aqueous dispersible, curable compositions of phosphorus-containing film formers with organo silanes and cured thermoset coatings therefrom and hydroxyl-containing and inorganic oxide-containing substrates coated therewith.

A variety of flame retardant coatings have been developed utilizing the flame retardant properties of phosphorus with organic polymers like formaldehyde condensates. These materials include: crosslinked condensates of tetrakishydroxymethyl phosphonium compounds; homopolymers of tetrakishydroxymethyl phosphonium compounds; and formaldehyde condensates with urea, melamine or phenolic compounds where the condensates include or entrap phosphoric acid. The progressive development of these materials increased the amount of phosphorus in the polymeric material to result in increased flame retardancy of the material, although this degree of improvement decreased with such increases. Other desired properties of such materials include: fire retardant durability, hydrolytic stability (water resistance), aging stability, which depend upon the structure of the polymer. For instance, hydrolytic stability of phosphorus-containing polymers is achieved when the polymer has phosphorus-carbon (P-C) bonds as opposed to phosphorus-nitrogen-carbon (P-N-C) bonds or phosphorus-oxygen-carbon (P-O-C) bonds. On the other hand, the preparation of the P-C bonds in the organic polymers is relatively difficult and more costly than synthesis of the other types of polymeric bonds. Also flame retardant durability impacts upon the ultimate flame retardancy of the material. If a coating on a substrate is relatively inflexible or abraids easily or has poor adhesion to a substrate, cracks or gaps may develop in the flame retardant coating on a substrate. A flame retardant coating with poor hydrolytic stability has poor flame retardant properties in a moist environment for similar reasons as the cracked flame retardant coating. The areas of coating erosion from the moisture and of gaps or cracks in a coating inadequately protect the substrate from heat or flame damage. Merely increasing the flame retardant properties of a coating by increasing the amount of phosphorus, for instance, by utilizing homopolymers of phosphorus-containing monomers inadequately addresses such problems and actually adds additional difficulties of more extreme formation conditions at greater expense.

An increasing number of articles require flame retardant materials, for instance, the explosion in the number of electronic devices utilized in the work place, in the field and in the homes. These and other different types of articles have multiplied the variety of geometric shapes and contours of surfaces and substrates requiring fire retardant coatings. Various textile materials require flame retardant coatings for garments and upholsteries while personal computers, computer terminals, video recording devices, and television sets require housings and supports which are flame retardant. The range of the different surfaces and substrates requiring flame retardant protection demands flame retardant coating having properties to meet the environment of use of the devices as well as having adequate flexibility and adhesion to avoid cracking of the coatings with resultant loss of flame retardant protection. The flame retardant coatings industry would welcome an advance that improves the stability and durability of flame retardant coatings without resorting to more expensive materials and processes.

It is an object of the present invention to provide flame retardant coatings having good hydrolytic stability, adhesion to substrates, while also having good flame retardant properties.

SUMMARY OF THE INVENTION

The present invention involves a curable aqueous dispersible mixture or interaction composition of a phosphorus-containing film former with reactable hydroxyl and/or methylol moieties and with an effective flame retardant amount of phosphorus and one or more hydrolyzable, nucleophilic organo silanes. The nucleophilic organosilanes are capable of reacting by nucleophilic reaction with hydroxyl radical displacement of one of the reactants or by Michael's-type reaction via nucleophilic phosphine compound. The mixture or interaction composition is further reacted to cure into a thermoset coating on hydroxyl-containing and/or inorganic oxide-containing surfaces. The interaction composition involves the reaction of the organo functional silane and the reactable hydroxyl and/or methylol moieties of the phosphorus-containing film former before curing occurs by heating or addition of curing agents.

DETAILED DESCRIPTION OF THE INVENTION

The phosphorus-containing film former has active hydroxyl and/or methylol groups for further reaction. Generally, the curable film former is any phosphorus-containing material, monomer or polymer, that forms a thermoset, continuous film that is not too rigid or brittle in the absence of a plasticizer. Formation of phosphorus-containing condensation polymers can be by various monomers and various reaction routes.

One nonexclusive example of forming phosphorus-containing condensation polymers involves reactants such as methylol phosphorus monomeric species reacted with ammonia to form a suitable nitrogen, methylol-phosphorus polymer. The methylol-phosphorus compounds can be those like tetrakis (hydroxy methyl) phosphonium chloride and tris (hydroxy methyl) phosphine oxide, hereinafter referred to as "THPC" and "THPO" respectively. The derivatives having phosphorus linked methylol groups are produced by reacting the THPC or THPO or mixture thereof with at least one other compound to form a product containing at least two $PCH_2OH$ groups in which the phosphorus atoms are members of phosphorus radicals of the group, trimethylene phosphine oxide, $(CH_2)_3PO$, tetramethylene phosphonium chloride, and $(CH_2)_4PC$. In addition to the ammonia as a reacting monomer, other nitrogen compounds can be used such as those having at least two members of the group hydrogen atoms and methylol radicals attached to a trivalent nitrogen atom. For example, melamine or a water soluble methylol melamine; a polyamine such as hexamethylene pentamine; a primary or secondary aliphatic, alicyclic or aromatic amine, such as cetyl amine, cyclohexyl amine, aniline or diethanol amine; a cyclic imine compound such as ethylene imine or polyethylene imine; a plurality of nitrogen compounds such as a water soluble methylol melamine and urea, or a water soluble methylol melamine and a primary or secondary amine; a polypeptide such as poly(hexamethylene adipamide) or a protein; at least phenolic compounds such as phenol, a napthol or an aromatic compound containing a plurality of hydroxyl groups attached to aromatic rings; a plurality of phosphorus linked methylol group reactive compounds, for example, at least one phenol compound and at least one nitrogen compound and the like, cyanamide and dicyandiamide. Also the polymer can have a built-in textile softening agent comprising a polymer of a mixture of THPC and THPO with a long chain aliphatic primary amine such as cetyl amine. When ammonia is used in a gaseous form, it is useable in a number of different ways. A few includes: as ammonium hydroxide as a solution of ammonia in an inert solvent, and/or as ammonia released in situ by the reaction of a compound capable of releasing ammonia such as an ammonium salt of a weak acid. Generally, these polymers are cross-linked phosphorus and nitrogen-containing polymers with recurring structural units each containing a phosphorus atom that is a component of a radical of the group of tetramethylene phosphonium chloride and trimethylene phosphine oxide that are linked to trivalent nitrogen atoms by at least methylene ($CH_2$) or methylene ether ($CH_2OCH_2$) structures. Such polymers can be produced in the form of solid synthetic resins or as polymers in aqueous solutions. These types of polymers generally can be formed by any method known to those skilled in the art such as those disclosed in U.S. Pat. No. 2,809,941 (Reeves et al.) and U.S. Pat. No. 2,772,188, both hereby incorporated by reference.

Another example of a suitable phosphorus-containing condensation polymer is that formed as a water-soluble phosphorus-containing condensation polymer formed by heating a THP compound under reduced pressure and acid conditions to condense it by dehydration and deformaldehydation reactions. Also a water-soluble condensation product can be obtained by condensing a THP compound in a nonaqueous solution like an inert organic solvent at a temperature of around 100° to 150° C. In producing the water-soluble condensation products by heat condensing a THP compound with an amino group-containing compound such as urea or dicyandiamide under ordinary pressure, the molar ratio of the reactants is usually about 1 mole of the THP compound and 0.02 to about 0.2 mole of an amino group containing compound. The condensation reaction is conducted at a temperature of around 40° to 120° C. in an aqueous or organic solvent system or even in a melted state. Also phosphorus-containing condensation polymers known to those skilled in the art having a controlled molar ratio of the phosphorus methylene phosphorus (P-$CH_2$-P) linkage and/or phosphorus methylene ether linkage (P-$CH_2OCH_2$-P) are useful. These are produced by heating the phosphorus-containing reactants under reduced pressure under acid conditions in a melted state or by heating the THP compound in an acid environment at high temperature in a melted state under reduced pressure. In these latter types of phosphorus-containing polymers, the content of phosphorus per repeating structural unit of the resulting condensation product is 25.4 percent with a methylene ether type condensation product and 33.7 percent of the methylene type condensation product. For these reactions, the THP compounds that can be used are exemplified by: THPC, tetrakis(hydroxymethyl phosphonium bromide), tetrakis (hydroxymethyl) phosphonium phosphate, tetrakis (hydroxylmethyl) phosphonium acetate, tetrakis (hydroxymethyl) phosphonium sulfate, tetrakis hydroxymethyl phosphonium oxalate, etc. And examples of the amino group containing compounds include N-alkyl melamines, formoguanamine, acetoguanamine, benzoguanamine, thiourea and urea and their derivatives such as: N-alkyl ureas, N-aryl ureas, cyclic ureas such as ethylene urea, propylene urea, trizone, urone, 4,5 dihydroxyethylene urea, and cyanamides, guanadine, guanalurea, alkyl carbamate, aliphatic amides, aromatic amides, biuret, alkylene diamine and the like. Generally, the molar ratios can run from around 0.1 to 1 and up to 2:1.

Another example of a phosphorus-containing condensation polymer that can be used is that formed by reactions of an aldehyde-donating compound with an alkylanol amine, amine and/or urea compound and with phosphoric acid. The aldehyde donating compound can be aldehydes such as: formaldehyde, acetalaldehyde, paraldehyde, glyoxal, or other mono-, di- or polyaldehydes and any substance yielding or acting as an aldehyde such as the hydroxylated and/or methylolated THP compounds. When the aldehyde is formaldehyde or any aldehyde generating formaldehyde, methods known by those skilled in the art to reduce the amount of free formaldehyde in the composition can be employed. The alkynolamine generally can have 1 to 4 carbon atoms in the alkyl group such as the triethanolamine. Also ammonium phosphate and ammonium sulfate can be used as buffering materials, and the phosphoric acid that can be used can be the commercially available 85 percent aqueous solution of phosphoric acid. Generally, these types of materials are formed by placing the buffer into water in a stirred tank with addition of the alkynolamine. While in a separate vessel, the phosphoric acid and formaldehyde can be combined and then added to the water solution. The phosphoric acid and formaldehyde mixture undergoes an exothermic reaction which requires continuous stirring. In addition, urea or melamine can be reacted with the phosphorus and formaldehyde.

Another type of phosphorus-containing polymer that can be used is that formed from a flame retardant acid or salt (heteroatom-containing compound) with a hydroxyl-containing and/or methylol-containing and quaternary phosphonium, and nitrogen-containing condensate prepolymer. The molar ratio of the former to the latter is in the range of about 1:1 to around 4:1. The flame retardant acid or salt is selected from phosphoric acid, diammonium hydrogen phosphate, boric acid, hydrogen bromide and the like. By the term "phosphoric acid", it is meant to include all the "oxyacids" of phosphoric such as: hypophosphoric ($H_3PO_2$), phosphoric ($H_3PO_4$), phosphorus ($H_3PO_4$), pyrophosphoric ($H_4P_2O_7$), metophosphoric ($H_3PO_3$)$_3$, polyphosphoric, and any of these esterified acids provided at least one free acidic functionality is present. The condensate prepolymer is formed from tetrakishydroxymethyl phosphonium salts like tetrahydroxykis phosphonium sulfate or tetrahydroxykis phosphonium chloride and nitrogen-containing compound having at least two active hydrogens and/or methylol radicals attached to a trivalent nitrogen. Examples of these compounds are like those aforementioned for other phosphorus-containing polymers. The mole ratio of the former (methyol-containing quarternary phosphonium compound) to the latter (heteroatom-containing compound is at least 1:0.5 to around 1:3 and the reaction is conducted at an effective pH, temperature and residence time to favor the formation of a methylene bridge linkages between the reactants rather than ether linkages. The curable polymeric reaction product is formed in an aqueous medium or by any other method known to those skilled in the art such as formation of powders. In the aqueous solution, the solids content of the curable reaction product can range up to around 95 weight percent. Also the condensate prepolymer is formed in an aqueous medium or in any other medium known to those skilled in the art.

Generally all of the phosphorus-containing condensate polymers are reacted in such a manner to provide active hydroxyl- and/or methylol groups and the molecular weight of the polymers can vary depending on the types of polymers used. Preferably, the polymers are water soluble to efficiently utilize the presence of any phosphoric acid by capturing the water soluble acid in the cured polymer.

The hydrolyzable and nucleophilic organo functional silane having an organic moiety with active hydrogens contains at least one and as many as three, hydrolyzable groups that are bonded to the silicon atom. Typical hydrolyzable groups include alkoxy of 1 to about 4 carbon atoms and alkoxy alkoxy containing up to 6 carbon atoms, halogens such as chlorine, fluorine and bromine, acryloxy of 2 to about 4 carbon atoms, phenoxy and oxime. Typical examples of the organo functional groups include: methacryloxy, primary amino, beta-amino ethyl amino, glycidyl, epoxy cyclohexyl, mercapto, ureido, polyazamide, N-phenyl amino and carbamate functional silanes and isocyanato functional silanes. The organofunctional silane can be mixed or interacted with the phosphorus-containing film former in the unhydrolyzed or hydrolyzed state. When the silane contacts a substrate, the silane is usually supplied as the hydrolyzed form. The hydrolysate is formed in the presence of a hydrolyzing agent such as a dilute acetic acid or sodium hydroxide solution. Generally, the silane has the formula:

wherein X is a hydrolyzable group and R' is hydrogen or alkyl having up to 4 carbon atoms, and n is an integer having a value from 1 to 3 and preferably 3, and R is the organic radical as listed above.

The preferred hydrolyzable silane is the ureido-functional alkoxy silane. The amount of the silane is an effective amount to provide up to enough silane to have one silane compound for every hydroxyl and/or methylol moiety in the phosphorus-containing film former.

The phosphorus-containing film former and hydrolyzable nucleophilic organofunctional silane can be utilized together in an aqueous mixture or as an interaction product. In a mixture, the amount of the film former is sufficient to provide an effective flame retardant amount and the amount of silane is in an effective amount for providing up to 1 silane compound for each reactive hydroxyl and/or methylol group on the polymer. The mixture is formed by combining the polymer and silane in the presence of a solvent, preferably water which can also contain latent curing agents which are initiated by heat or chemical reaction.

The interaction product of the polymer and silane occurs by copolymerization or by chain extension. The conditions for the interaction are generally a temperature in the range of greater than the freezing point of the reaction mixture to around 50° C. atmospheric pressure depending on the reactivities of the reactants, although other equivalent conditions can be used. Preferably, the formation of the interaction product is by chain extension. When the interaction product is formed by copolymerization, the silane is added to the monomers used to prepare the phosphorus-containing condensation polymer. For instance, the ureido functional silane coupling agent can be combined with the THP compound and urea in forming a phosphorus-containing silane-containing copolymer. Preferably, the pH conditions of the interaction formation should not be too low to cause hydrolysis of the hydrolyzable groups of the silane. When the reactive organo functional silane is used as a copolymer with the other phosphorus-containing polymer reactants, the amount of the silane should not be too great to produce a substantial quantity of monovalent species that would retard the polymerization reaction. Generally, the grafting of the reactive organo functional silane occurs at the hydroxyl groups of the phosphorus-containing condensation polymer. Grafting can be affected by a direct reaction wherein the reactive group of the reactive organo functional silane is one which is coreactive with the hydroxyl group on the aldehyde or the THP compounds used to form the condensation polymer. For instance, the ureido functional silane such as gamma ureido propyl triethoxy silane can be reacted with the hydroxyl functional condensation polymer or THP monomer or aldehyde monomer. Also a isocyanato propyl triethoxy silane can be reacted with the hydroxyl functional polymer or monomers. While such a reaction can be carried out in the absence of a solvent by maintaining the hydroxyl functional condensate polymer or monomers in a melt stage during the reaction, a solvent is preferably employed. The solvent is of the type where the materials are soluble in the solvent while the solvent is inert to the reactants. Those skilled in the art would recognize such solvents which are suitable; however, one can mention several nonexclusive examples such as acetone, methyl ethyl ketone and the like. The solvent can be employed at a concentration of up to 95 weight percent preferably from around 50 weight percent to 90 weight percent. The reaction time can vary from a few hours to around 24 hours depending on catalysis, temperature, etc. Typically, the reaction can be carried to completion in 4 to 5 hours using an appropriate catalyst and temperature.

Alternatively, the interaction polymer of the present invention can result from reaction of the phosphorus-containing reactive hydroxyl functional condensation polymer by direct grafting reaction with an oxirane functional organo silane such as glycidoxy propyltrimethoxy silane or beta-(3,4-epoxycyclohexyl) ethyl trimethoxy silane. The grafting reaction may occur through the hydroxyl-functional moieties or amide moieties of the phosphorus-containing condensation polymer. Such a reaction between the oxirane group and the hydroxyl group is one which would be immediately understood by those skilled in the art and they will know the conditions under which such reactions proceed without further elaboration herein. Generally, the reaction can be carried out at room temperature or higher using a tertiary amine catalyst or at elevated temperatures on the order of about 40° C. without a catalyst.

Other methods of grafting organo functional silane groups onto the polymer backbone involve first reacting a difunctional organic compound with the hydroxyl-functional phosphorus-containing condensation polymer or with an organo functional silane having active hydrogens on the organic moiety containing silicon-bonded hydrolyzable groups thereon to form a monofunction intermediate which is subsequently reacted with the reactive organofunctional silane or the hydroxyl-functional phosphorus-containing condensation polymer. The difunctional organic compound can be any one in which at least one of the functional groups is coreactive with the hydroxyl groups of the condensation polymer, at least one of the functional groups is coreactive with the active hydrogen of the organic moiety of the organofunctional silane, and the remaining segment is an essentially inert moiety. For purposes of defining the difunctional organic compound, an ethylenically unsaturated site capable of undergoing reaction with the organo functional group of the reactive organo functional silane is considered a functional group. Typically the difunctional organic compound is an organic diisocyanate by employing an organic diisocyanate in this manner a number of reactive organo functional silanes which are widely commercially available but which are not directly coreactive with the hydroxyl-functional phosphorus-containing condensation polymer can thereby be conveniently grafted onto the condensation polymer backbone. For example, the organic diisocyanate can be reacted with a primary amino-silane to produce an isocyanato silane which contains a urea moiety and the isocyanate silane thus produced is subsequently reacted with the hydroxyl functional phosphorus-containing condensation polymer. Other difunctional organic compounds which are useful in preparing the graft copolymer of this invention include the halide salts of alpha beta unsaturated carboxylic acids such as acryloyl chloride. The halide salt is first reacted with the hydroxyl functional phosphorus containing condensation polymer resulting in esterification of the hydroxyl group and the production of HCl as a biproduct. The esterified condensation polymer is subsequently reacted with a reactive organo functional silane wherein the organo functional group contains a reactive hydrogen atom such as an amino-silane in the presence of sodium amide or sodium alkoxide. The reactive hydrogen atom of the organo functional groups adds across the ethylenically unsaturated bond in a Michael's condensation. In the foregoing examples, the production of copolymers having ether linkages as opposed to methylene bridges will usually have less water resistance than those formed with the methylene bridge linkage.

In addition to formation of the interaction polymer by direct reaction, the hydroxyl functional phosphorus-containing condensation polymer can be chain extended with the reactive hydrogen containing organo functional silane compound. In this approach, any of the aforementioned organo functional silanes are added to the curable hydroxyl functional phosphorus-containing condensation polymer after the polymer is formed rather than in situ during polymerization. As opposed to the direct polymerization approach, the amount of the organo functional silane added in the chain extension approach can extend up to that amount which will react with all of the hydroxyl functionalities of the condensation polymer. Since in chain extension, the polymer is already formed having all of the hydroxyl functionality reacted would still allow for curing through siloxane bonding and siloxane curing as opposed to hydroxyl reactive curing. In the direct polymerization approach, not all of the hydroxyl functionality can be reacted with the active hydrogen of the organic moiety of the organic functional silane in order not to inhibit polymerization. In the chain extension approach, all of the hydroxyl functionality can react on the condensation polymer since curing can occur through the silane group forming siloxanes. To provide the improved adhesion and water resistance, the minimum amount of silane that should be present in the polymer is 1 percent by weight of the polymer solution.

The mixture of the hydroxyl functional phosphorus containing condensation polymer and organo functional silane with active hydrogen groups in the organic moiety or in the interaction product thereof can be present or placed in an aqueous solution. The weight percent solids of the components of the mixture or the interaction product are generally in the range of up to around 95.

The aqueous solution of the curable polymeric reaction product optionally contains various types of fillers and/or extenders. Nonexclusive examples of these include: silicas like hydrated silica, precipitated silica, Hi-Sil® silicas, silicates, clays, titanium dioxide, wallostonite, vermiculite and the like. The amount of these materials which are incorporated into the aqueous solution of curable polymeric reaction product varies somewhat for the different types of materials. Generally, the amounts range up to around 50 weight percent of the coating. Generally, the addition of these materials is performed to prepare a stable, curable, polymeric reaction product with shelf life.

In addition, surfactants can be added to the aqueous solution of curable polymeric reaction product. This results in better film properties of cured coating on some types of substrates. Also internal surfactants can be incorporated into the curable polymeric reaction product in the prepolymer or direct reaction sequence.

Also, the aqueous solution of curable polymeric final product with curing agent can be formulated into intumescent coatings using components known to those skilled in the art. For instance, an intumescent coating is prepared as an aqueous slurry with melamine formaldehyde silica like Hi-Sil silica, and wallostonite.

In addition, a heat sensitive curing agent can be placed in the aqueous solution with the mixture or interaction product to induce curing upon heating of the mixture or interaction product applied to a substrate. A suitable curing agent for addition to the aqueous solution is a nitrogen-containing compound as those aforelisted as coreactants to form the condensation polymers.

Therefore, after the formation of the aqueous dispersion of the polymeric reaction product by either the prepolymer or direct reaction routes, the remaining amount of the nitrogen-containing compound from the deficient amount reacted to produce the prepolymer condensate is added. In addition, any other curing agents such as water dispersible aminoplast and phenoplast resin such as hexamethylol melamine and phenolformaldehyde A-stage novalacs can be used. Various substrates can be treated with the aqueous dispersion by any manner known to those skilled in the art such as dipping, brushing, spraying, padding, contacting with rollers and the like.

Generally, the aqueous solution can be applied to the substrates as a primer coating. Also various types of known thixotropic agent can be added at this point to increase the viscosity for supplying the curable polymeric reaction product as a gel. Additionally, any other known means can be employed for supplying the solution to the substrates. The substrates, which can be treated, include hydroxyl-containing substrates like cellulosic materials such as: fiber boards, wood, viscous, cellulose containing textiles, fabrics and mats, and pulp paper products and the like.

The aqueous solution of the mixture and/or interaction product can be contacted with numerous types of substrates including inorganic oxide substrates and hydroxyl containing substrates. The inorganic oxide substrates include: any inorganic solid material which possesses either oxygen (chemisorbed or covalently bonded as in oxide coatings of aluminum and iron or steel) or hydroxyl (bonded or free) at its exposed surface. It also includes any material which can be treated by silane coupling agents known in the prior art. The inorganic oxide material can be any form including particles of irregular or regular (e.g., spherical) shape, individual fibers, woven fiber mats or fabric or continuous surfaces such as sheets, films, slabs and formed surfaces. Specific illustration of suitably employed inorganic oxide materials are, for example, brass with an oxidized surface, copper metal with an oxidized surface, aluminum metal with an oxidized surface, iron or steel with an oxidized surface, alumina, aluminum, trihydrate, siliceous materials such as fumed silica, hydrated silica (precipitated silica), silica aerosols, silica zero gels, aluminum silicates, calcium magnesium silica, asbestos, glass fibers, clays, molecular sieves, wallostonite, calcium carbonate, carbon black (including lamp black), titanium dioxide including titanium dioxide which contains hydrochloric acid soluble alumina and/or silica, calcium sulfate, magnesium sulfate, calcium carbonate including silica coating or agglomerated to silica, vermiculite, mica and the like. The aqueous solution of the mixture or interaction product is supplied to the surface of the substrate preferably as a hydrolysate or partial condensate of the hydrolysate prior to contacting the substrate. The aqueous solution can be applied to the substrates as a primer coating to the surface in the form of a solution or by a suitable means such as brushing, contacting with rollers or by spraying. Additionally, any other means known in the art for applying solutions to inorganic oxide surfaces or hydroxyl containing surfaces can be employed. The hydrolysis and subsequent curing of the mixture or interaction product is affected by evaporating the water from the solution, drying the solution by any means known to those skilled in the art or by heating the solution to evaporate and dry the solution. When the mixture or interaction product is applied directly to the surface of the substrate, the affective amount can vary from about 0.1 weight percent to about 10 weight percent based on the weight of the substrate. When applying the mixture or interaction product from an aqueous solution as a primer to a surface of a substrate, the effective amount of the mixture or interaction product can vary from about 0.05 grams per square meter to about 1.5 grams per square meter. Such an amount on the substrate provides effective flame retardancy with good adhesion of the coating to the substrate and good water resistance of the coating.

The curing of the curable polymeric reaction product applied to the substrate is affected by evaporation of water from the solution and/or by chemical reaction. Generally, after the substrates are treated with the aqueous dispersion of the polymeric reaction product with curing agent, the substrates are dried and the coating is cured generally by heating to a temperature of from about 60° to about 150° C. The drying of the substrate may involve a first drying step in a conventional manner to a fairly low moisture content at a temperature between about 40° and 70° C. Thereafter, the substrate is cured further by heating to a temperature between 60° and 150° C. Curing temperatures greater than 110° C. should not be used on substrates that are cellulosic since adverse affects on the properties of the substrate may develop. However, care must be taken to ensure that sufficient temperatures and times are used properly to cure the coated substrates. The best conditions may be determined readily by one of ordinary skill in the art. The cured coatings on the substrates can have varying thicknesses depending on the amount of curing agent are other components in the formulation. Generally film thickness are obtainable in the range of about 1 to 10 mils.

PREFERRED EMBODIMENT

The preparation of the prepolymer condensate preferably involves the reaction of tetrakis (hydroxylmethyl) phosphonium sulfate and urea in a molar ratio in the range of 1:1 to 1:1.7 in the presence of a tertiary amine such as triethanolamine in an amount to give a pH for the reactants in water in the range of about 7 to about 8. After the reactants are dissolved in water and the base is added, a catalyst such as diammonium phosphate is added in sufficient amounts to begin the reaction at ambient temperatures. The reaction is conducted for a period of time ranging from about 0.5 to about 24 hours without the removal of water. Afterwards, phosphoric acid is added to the aqueous dispersion in an amount to give a molar ratio of the phosphoric acid to the prepolymer condensate of 1:1 up to about 4:1 respectively. Addition of phosphoric acid results in an exotherm that is controlled to under 100° C. This reaction is conducted for any length of time since the reaction is limited by the addition of a deficient amount of phosphoric acid to complete the reaction. The resultant aqueous dipsersion of resinous reaction products has a nonvolatile solids content in the range of about 70 to around 80 weight percent. The polymeric reaction product a ureido functional with hydrolyzable groups is added. The addition is in an amount to form a ratio of silane to reactive hydroxyl moiety of the polymer of 1:1 to 1:6.

For curing the resinous reaction product, the remaining amount of urea is added to provide a stochiometric amount of urea for the amount of thps initially reacted to form the prepolymer condensate. This addition is conducted at ambient temperatures and the aqueous dispersion is stable for up to several months. This aqueous dispersion is coated onto substrates, preferably fiber board or glass, and cured at a temperature in the range of around 130° C. to around 150° C. to drive off water and complete the reaction of the urea and the resinous reaction product. The resultant coating has good flexibility, hydrolytic stability and durability.

Numerous experiments have been performed which demonstrates how to make and how to use and the effectiveness of this invention. The following examples illustrate the invention but should not be construed as limiting the scope of the invention.

EXAMPLE 1

An amount of 29 grams of tetrakishydroxymethyl phosphonium sulfate and 15 grams of phosphoric acid were combined in a round bottom flask equipped with a magnetic stir bar and a nitrogen purge. To this was added 30 grams of a 50% aqueous urea solution followed by 30 minutes of stirring. A 5 gram aliquot was removed and combined with 0.1 gram of gamma-ureidopropyltriethoxy silane (A-1160). Films were cast on glass slides and cured at 130°-150° C. for 30 minutes.

EXAMPLE 2

Gamma-ureidopropyltriethoxy silane (A-1160) in the amount of 2.0% by weight was added with stirring to the remaining resin solution prepared in Example 1. Films were cast on glass slides as described in Example 1. Qualitative water resistance of the resinous films were ascertained by placing a drop of water on the film. Films of Example 1 cracked and peeled off glass substrate whereas films from Example 2 remained intact.

EXAMPLE 3

In a round bottom flask tetrakis hydroxylmethyl phosphonium sulfate as Retardol S in an amount of 58 grams (0.107 mole) was combined with urea in an amount of 60 grams (0.5 mole) and triethanolamine in an amount of 12 grams (0.081 mole) stirred for 0.5 hour. To this slightly yellow-colored solution, there was added an amount of 30 grams (0.26 mole) of phosphoric acid. To five grams aliquot of this solution, an amount of 0.1 gram of ureido-functional silane was added, while the remaining portion of the solution did not have any added silane. Films were cast on glass slides and cured by heating at 120° C. for around 0.5 hour. The non-silane-containing dried residue or film cracked and peeled off the glass slide. The silane-containing film was a smooth coating and did not crack and/or peel when contacted with water in a water resistance test as in Examples 1-2.

EXAMPLE 4

A round bottom flask was charged with tetrakishydroxymethyl phosphonium sulfide (50 grams, 92.4 mole) and urea (8.8 grams, 147 mole) then stirred until homogeneous. To this was added triethanolamine (5.1 grams, 34.2 mole) and ammonium phosphate silane (0.020 gram, 1.52 mole) followed by 24 hours of stirring at which time phosphoric acid (16 grams, 139 mole) was added. Stirring was continued until cool. Urea in the amount of 3.0 gram per 100 grams of above resin was combined prior to use.

EXAMPLE 5

A round bottom flask equipped with a magnetic stir bar was charged with a 50 percent aqueous solution of urea (62 grams), (0.52 mole) triethanolamine (12 grams), THPS as Retardol S (58 grams) (0.11 mole), and a cold (−20° C.) aqueous solution of acetaldehyde (40 percent by weight), 72 grams (0.65 mole). The flask was quickly capped with a rubber septum to prevent escape of acetaldehyde and stirred for 0.5 to 1 hours. The flask was vented with a needle and phosphoric acid (30 grams) was added via syringe. The vent needle was removed and the mixture stirred until cool (room temperature). To this mixture 7 grams of gamma-ureidopropyltriethoxy silane (A-1160) was added with stirring. Films cast on glass slides as described in Examples 1 and 2 showed better water resistance than the resin solution without A-1160.

EXAMPLE 6

A round bottom flask was charged with 7568 grams of water and tetrakishydroxymethyl phosphonium sulfate (1726 grams, 3.19 mole) and heated to 70°-75° C. To this solution was then added urea (304 grams, 5.07 mole) with stirring and 5 hours of continued heating. The solution was cooled to room temperature and an additional amount of urea (75.8 gram, 1.26 mole) was added. Films were cast on glass slides and cured at 150° C. for 30 minutes. To 100 grams of the resin, there was added 0.23 gram of gamma-ureidopropyltriethoxy silane (A-1160) with stirring. Once again, films were cast on glass slides and cured at 150° C. for 30 minutes. Films with and without the organo silane were subjected to 10 minutes of boiling water with the following results. The resin without silane resulted in 88% water extractables whereas the resin with silane gave 82% water extractable.

EXAMPLE 7

An amount of 85 grams (0.157 mole) of THPS (Pyroset TKOW) was combined with 15 grams (0.25 mole) of urea and 700 grams of water and warmed in a water bath, where the external temperature was 98° C. and the resin temperature was 92° C. After an hour, an aliquot was removed and a film was formed on a glass slide. Upon cooling, the mixture became turbid. Ureido functional organosilane (A-1160) and phosphoric acid were added to the aliquot and the reaction was continued for 2 hours. A small amount of white precipitate formed and two additional grams of phosphoric acid was added to stabilize the solution which produced a good film former. The solution was coated onto a heat cleaned and finished glass fiber strand fabric and air dried for approximately 30 minutes to 1 hour. This sample was compared to the heat cleaned and finished glass fiber strand fabric in a burn through test. The uncoated fabric burned through within 5 seconds, whereas the coated fabric had a 3 minute burn through for one sample and after 8 minutes, no burn through for a second sample. The amount of the coating on the fabric by a loss on ignition test was 4%.

EXAMPLE 8

In a manner similar to that of Example 3, two formulations of a phosphorus-containing condensate with silane were prepared which also had the addition of a vermiculite or filler. The formulations were:

| Material | Amount | |
| --- | --- | --- |
| | Sample 1 | Sample 2 |
| Prepolymer before the addition of the ureido functional silane | 228 grams | 114 grams |
| Ureido functional silane | 20 grams | 10 grams |
| Water | 200 grams | 100 grams |
| Aqueous vermiculite dispersion | 532 grams | 266.4 grams |
| Water | 1310 grams | 1510 grams |

In the foregoing formulations, the prepolymer and ureido-functional silane and water were combined, and to this combination, the vermiculite dispersion and water were added slowly while blending at a high speed.

These formulations were used to coat texturized glass fiber strand yarn having a designation of TEXO ® 1.75 yarn available from PPG Industries, Inc., Pittsburgh, Pa.

The first formulation was placed on the TEXO ® yarn by passing the yarn through an aqueous slurry with removal of excess water and passing the treated yarn through an oven for 5 passes in the oven at a temperature of 500° F. The winder pulling the yarn through the oven was running at a speed of 46 to 35 rpm. The air pressure of the feeder feeding the yarn into the oven was 40 psi. This method and formulation was used to make 6 packages having an add on of the formulation in weight percent as follows: Package 1, 0.99 to 1.07; Package 2, 2.9; Package 3, 3.4; Package 4, 3.8; Package 5, 5.4 (wet); Package 6, 4.3 (wet).

A similar method was used in applying the second formulation to TEXO ® yarn 6.0, but the temperature of the oven and the speed of the winder varied. The temperature was 450° to 460° F. and the speed was 57 to 68 rpm. The air die feeding the yarn to the oven had an air pressure of 36-38 psi. Five packages were made with the dried formulation and had the following add on in weight percent: Package 1, 2.6%; Package 2, 2.7%; Package 3, 2.6%; Package 4, 2.4%; Package 5, 2.4%.

These packages of coated yarns were subjected to a propane torch flame test. The flame was held on the sample yarn for no more than 3 minutes and the flame was positioned at 90° to the sample at a distance of 3 inches. This allowed the blue portion of the flame to just impinge the fabric being tested. If a hole was made in the yarn or fabric made from the yarn, the time was recorded and the test continued for another 30 seconds. If no degradation was obvious, the full 3 minutes of flame was allowed. After the samples cooled, the affected areas were examined for integrity by tapping and probing with a pointed instrument.

The test was conducted on uncoated TEXO ® yarn and the coated TEXO ® yarn, each produced in the form of a tape. The uncoated TEXO ® tape had a small burn through hole after 27 seconds. After an additional 30 seconds of flame, a hole the size of a dime was obtained. Around the hole the yarns had melted to form molten beads of glass. The coated TEXO ® yarn tape took a full 3 minutes of flame without creating a hole, but during the flame the impinged area showed signs of change. Small bubbles appeared which swelled but did not break. A distinctive odor was detected which was not a bad odor but still noticeable, and at the area of impingement, the coating became very bright, almost a white incandescent which caused sensation to the eyes. Probing the affected area, the integrity of the tape was adequate.

In flame testing the TEXO ® yarn in the form of a rope, the uncoated TEXO ® rope took only 14 seconds for the knitted glass rope to melt into and drop off the test ring. At the point of flame, both ends had melted glass fused back about ¼ inch. The coated TEXO yarn took a full 3 minutes of flame without degradation to the point of falling into two pieces. After the flame test, the rope had good strength and behaved like textile fabrics.

We claim:

1. A curable, chemical mixture for forming a flame retardant coating on hydroxyl-containing and/or inorganic oxide-containing surfaces, comprising:
   (a) phosphorus-containing film former having functionalities selected from the group consisting of hydroxyl and methylol or mixture thereof, and
   (b) at least one nucleophilic organo silane selected from the group consisting of organo silanes capable of undergoing nucleophilic reaction with hydroxyl radical displacement and organosilanes capable of Michael addition type of reaction via a nucleophilic phosphine compound.

2. Curable chemical mixture of claim 1 including a solvent in an effective amount to provide for a solids content up to around 95 weight percent.

3. Curable chemical mixture of claim 2, wherein the solvent is water.

4. Curable chemical mixture of claim 1, wherein the phosphorus-containing film former is a phosphorus-containing condensation polymer.

5. A curable chemical mixture of claim 1, wherein the film former and silane are in a mixture for application to a substrate and the mixture has a curing agent for curing the mixture as a coating on the substrate.

6. Curable chemical mixture of claim 1, wherein the phosphorus-containing film former and silane form an interaction product by condensation reaction.

7. Curable chemical mixture of claim 6, wherein the interaction product is formed by direct polymerization of hydroxyl donating monomer and active hydrogen containing monomer and the active hydrogen organo functional silane.

8. A curable chemical mixture of claim 6, wherein the interaction product is formed by a chain extension reaction by addition of the active hydrogen organo functional silane to the hydroxyl functional phosphorus-containing film former.

9. A curable chemical mixture of claim 1, wherein the phosphorus-containing film former is selected from the group consisting of aldehyde condensation polymers including aminoplasts and phenoplasts and phosphoric acid; tetrakishydroxy phosphonium compounds and nitrogen containing compounds to produce methylol-containing phosphorus condensates with and without further reaction with phosphoric acid compounds; and condensate of tetrakishydroxy phosphonium compounds.

10. A curable chemical mixture of claim 1, wherein the nucleophilic organo functional silane is selected from the group consisting of epoxy functional organo silane, mono and polyamino organo functional silane, ureido organo functional silane, isocyanato or organo functional silane, halo organo functional silane, carbamate organo functional silane, phenyl amino organo functional silane, and ammonium phosphate silane.

11. Curable chemical mixture of claim 1, wherein a difunctional nitrogen-containing compound is used as a curing agent.

12. Curable chemical mixture of claim 1 having present an inorganic filler.

13. Substrates selected from the group consisting of hydroxyl-containing and inorganic oxide-containing coated with the chemical mixture of claim 1.

14. A curable chemical mixture that is a resinous aqueous solution for forming a fire retardant coating on hydroxyl and/or oxide-containing substrates, comprising:
   (I) an aqueous soluble phosphorus-containing interaction polymer of:
      (A) methylol-containing quaternary phosphonium compound having radicals selected from the group consisting of methylol and hydroxyl or a mixture thereof,
      (B) divalent, nitrogen-containing compound having at least 2 active radicals selected from the group consisting of: hydrogen and methylol groups and mixtures thereof wherein said radicals are affiliated with a trivalent nitrogen, and (C) heteroatom-containing compound capable of reaction with radicals selected from the group consisting of methylol and hydroxyl, wherein the mole ratio of the components is about 1:1 to around 4:1 for Component A to Component b and at least 1:0.5 to around 4:1 for Component A to Component C, and (D) at least one nucleophilic organo silane selected from the group consisting of organo silanes capable of undergoing nucleophilic reaction with hydroxyl radical displacement and organosilanes capable of Michael addition type of reaction via a nucleophilic phosphine compound, and (II) water in an amount to provide a total solids of the aqueous solution in the range of up to around 95 weight percent.

15. Curable chemical mixture of claim 14, wherein the interaction polymer of Components A, B and C are in a mixture with the nucleophilic organosilane for application to a substrate.

16. Curable chemical mixture of claim 14, wherein the amount of the nucleophilic organosilane is sufficient to act as a crosslinking curing agent.

17. Curable chemical mixture of claim 14, wherein the interaction polymer and nucleophilic organosilane form a resultant curable interaction polymer.

18. Curable chemical mixture of claim 14, which includes a difunctional nitrogen-containing compound as a curing agent.

19. Curable chemical mixture of claim 14, wherein the nucleophilic organofunctional silane is selected from the group consisting of: glycidoxy organo functional silane, epoxyorgano-functional silane, mono- and polyamino-organo functional silane, ureido organo-functional silane, halo organo-functional silane, isocyanato-organo-functional silane, carbamate organo-functional silane, phenyl amino organo-functional silane, and ammonium phosphate silane.

20. Curable chemical mixture of claim 14, which includes an inorganic filler.

21. Coated substrate of claim 14, wherein the curable resinous aqueous solution has present an aldehyde donor which is acetaldehyde.

22. Resinous solution of claim 14, wherein the amount of the organo functional silane with active hydrogens is present in an amount of a molar ratio of active hydrogen organic functionality to hydroxyl functionality of the condensation polymer in the range of up to 1:1 where amounts of 1:1 allow for curing by siloxane bonding in amounts less than 1:1 allow for curing through hydroxyl reactions to form ether linkages to methylene bridges.

23. Substrates selected form the group consisting of hydroxyl-containing and inorganic oxide-containing coated with the cured chemical mixture of claim 14.

24. A curable, chemical interaction product for forming a flame retardant coating on hydroxyl-containing and/or inorganic oxide-containing surfaces, comprising:

(a) phosphorus-containing film former having functionalities selected from the group consisting of hydroxyl and methylol or mixtures thereof, and (b) at least one nucleophilic organo silane selected from the group consisting of organo silanes capable of undergoing nucleophilic reaction with hydroxyl radical displacement and organosilanes capable of Michael addition type of reaction via a nucleophilic phosphine compound.

* * * * *

UNITED STATES PATENT AND TRADEMARK OFFICE
CERTIFICATE OF CORRECTION

PATENT NO. : 4,784,918

DATED : November 15, 1988

INVENTOR(S) : Michael W. Klett et al

It is certified that error appears in the above-identified patent and that said Letters Patent is hereby corrected as shown below:

Column 15, line 5, "Component b" should read "Component B".

Signed and Sealed this

Thirteenth Day of February, 1990

Attest:

JEFFREY M. SAMUELS

Attesting Officer     Acting Commissioner of Patents and Trademarks